(12) United States Patent
Shirodkar

(10) Patent No.: US 10,854,107 B2
(45) Date of Patent: Dec. 1, 2020

(54) TRAINING SCISSORS

(71) Applicant: Zubin Shirodkar, Plainview, NY (US)

(72) Inventor: Zubin Shirodkar, Plainview, NY (US)

( * ) Notice: Subject to any disclaimer, the term of this patent is extended or adjusted under 35 U.S.C. 154(b) by 295 days.

(21) Appl. No.: 15/915,895

(22) Filed: Mar. 8, 2018

(65) Prior Publication Data
US 2018/0268741 A1 Sep. 20, 2018

Related U.S. Application Data

(60) Provisional application No. 62/469,712, filed on Mar. 10, 2017.

(51) Int. Cl.
*G09B 19/24* (2006.01)
*B26B 13/20* (2006.01)
*B26B 13/28* (2006.01)
*F21V 23/04* (2006.01)
*B25G 1/00* (2006.01)
*F21Y 113/13* (2016.01)
*F21V 33/00* (2006.01)
*F21Y 115/10* (2016.01)

(52) U.S. Cl.
CPC .............. *G09B 19/24* (2013.01); *B25G 1/00* (2013.01); *B26B 13/20* (2013.01); *B26B 13/28* (2013.01); *F21V 23/0492* (2013.01); *F21V 33/0048* (2013.01); *F21Y 2113/13* (2016.08); *F21Y 2115/10* (2016.08)

(58) Field of Classification Search
CPC ............................... B26B 13/20; G09B 19/24
USPC ........................................................ 434/260
See application file for complete search history.

(56) References Cited

U.S. PATENT DOCUMENTS

| 2,184,909 | A | * | 12/1939 | Crompton | ............... B26B 13/20 |
| | | | | | 30/256 |
| 2,370,026 | A | | 2/1945 | Elia | |
| 4,453,311 | A | | 6/1984 | Twigger | |
| 5,146,810 | A | | 9/1992 | Mueller | |
| 6,341,424 | B1 | * | 1/2002 | Kenny | ..................... B26B 13/14 |
| | | | | | 30/232 |
| 2006/0174448 | A1 | | 8/2006 | You | |
| 2007/0019309 | A1 | * | 1/2007 | Neal | ....................... B26B 13/22 |
| | | | | | 359/844 |
| 2012/0195027 | A1 | | 8/2012 | Russ et al. | |

FOREIGN PATENT DOCUMENTS

FR          2648384 A1   12/1990

* cited by examiner

*Primary Examiner* — Thomas J Hong
(74) *Attorney, Agent, or Firm* — Luedeka Neely Group, P.C.

(57) ABSTRACT

A pair of training scissors structurally configured to help a child learn proper finger positions for use of scissors. The handles include solid bowl apertures to positioned so that the tips of the fingers are desirably positioned so that the tips of the fingers are utilized to operate the scissors. The scissors also include an illumination feature that encourages a child to practice opening and closing the scissors as they are motivated by the light. This repetition serves to reinforce the proper finger positions, and the repetitions also help develop muscle strength.

8 Claims, 8 Drawing Sheets

TRAINING SCISSORS

CROSS REFERENCE TO RELATED APPLICATION

This application claims priority to U.S. Provisional Application No. 62/469,712 filed Mar. 10, 2017, entitled TRAINING SCISSORS, incorporated by reference herein in its entirety.

FIELD

This disclosure relates to the field of scissors. More particularly, this disclosure relates to scissors configured to teach proper finger placement and that are fun to use and encourage learning of the use of scissors.

BACKGROUND

Improvement is desired in the construction of scissors, and particularly scissors for use by young persons, such as those of preschool age.

What is needed are scissors configured to promote desired use of the scissors, and which are also configured to make use of the scissors fun and enjoyable, so that the user will spend sufficient time using the scissors to develop proper use habits.

SUMMARY

The disclosure advantageously provides training scissors of improved construction.

In one aspect, training scissors according to the disclosure include a first handled blade pivotally connected to a second handled blade. The first handled blade has a first cutting edge opposite a first handle configured as a pair of bowled apertures, each configured as solid bowls that block passage of fingers of a user and locate the fingers of the user to be positioned so that the tips of the fingers are desirably positioned so that the tips of the fingers are utilized to operate the scissors. The scissors also include a shaft assembly and an illumination source.

In another aspect, training scissors according to the disclosure include a first handled blade pivotally connected to a second handled blade. The first handled blade has a first cutting edge opposite a first handle configured as a pair of bowled apertures, each configured as solid bowls that block passage of fingers of a user and locate the fingers of the user to be positioned so that the tips of the fingers are desirably positioned so that the tips of the fingers are utilized to operate the scissors. The second handled blade has a second cutting edge opposite a second handle, and is configured as a solid bowl that blocks the fingers of the user. The scissors also include an illumination source operatively associated with the first and second handled blades and configured to illuminate in a first color for a time period when a user opens the scissors, and in a second and different color for a time period when the user closes the scissors.

In yet a further aspect, training scissors according to the disclosure include a first handled blade pivotally connected to a second handled blade. The first handled blade has a first cutting edge opposite a first handle configured as a pair of bowled apertures. One of the bowled apertures is larger than the other and each configured as solid bowls that block passage of fingers of a user and locate the fingers of the user to be positioned so that the tips of the fingers are desirably positioned so that the tips of the fingers are utilized to operate the scissors. The second handled blade has a second cutting edge opposite a second handle, and is configured as a solid bowl that blocks the fingers of the user.

The scissors are structurally configured to help a child learn proper finger positions for use of scissors. In addition, the illumination feature encourages a child to practice opening and closing the blades as they are motivated by the light. This repetition serves to reinforce the proper finger positions, and the repetitions also help develop muscle strength.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
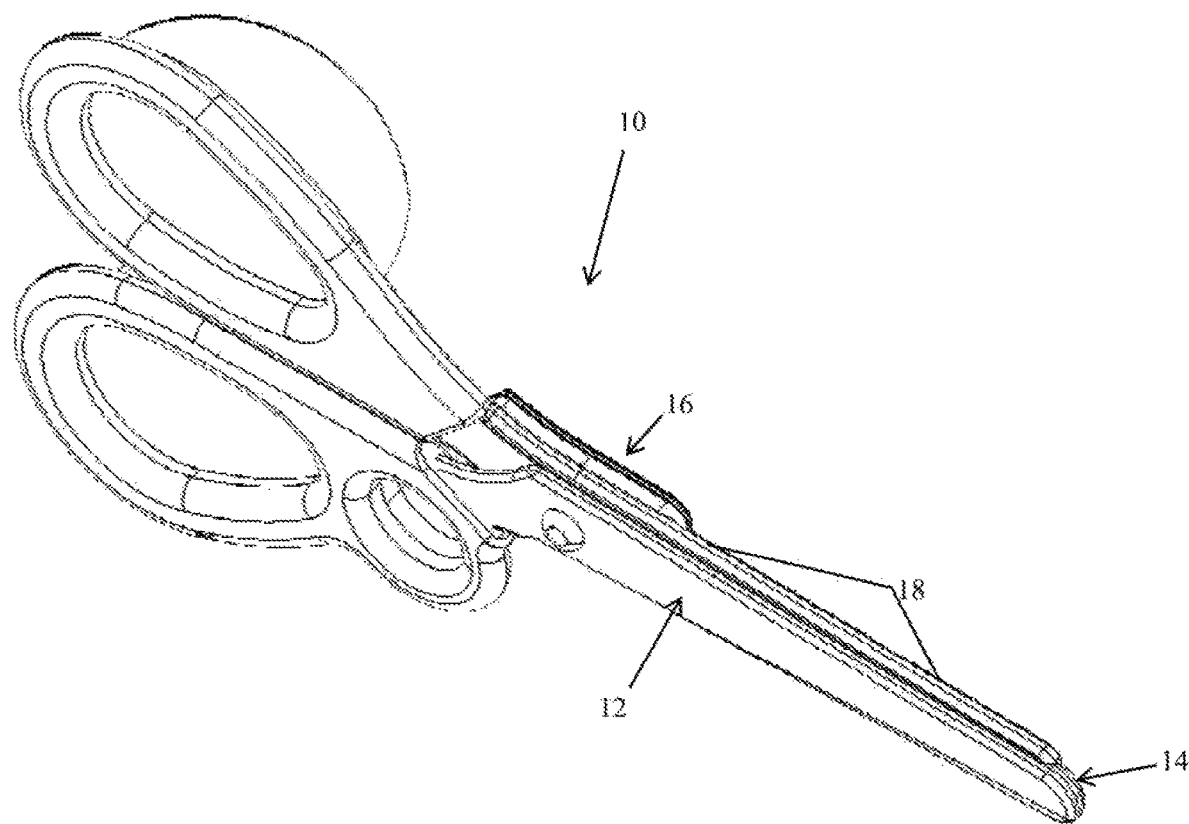
FIGS. 1 and 2 are perspective views of scissors according to the disclosure.

With reference to the drawings, there are shown a pair of training scissors 10 having a pair of pivotally connected handled blades 12 and 14, a shaft assembly 16, and an illumination source 18.

The handled blade 12 has a cutting edge 20 opposite a handle 22. The handle 22 is configured as a large bowled aperture 22a and a smaller bowled aperture 22b. A pivot aperture 24 extends through the handled blade 12. The bowled apertures 22a and 22b are configured as solid bowls that block passage of the fingers and shaped to locate the fingers of a user to be positioned so that the tips of the fingers are desirably positioned so that the tips of the fingers are utilized to operate the scissors.

The use of the fingertips is desirable in that it facilitates control and avoids undesirable finger positioning as can occur with conventional open handle apertures. That is, apertures as used in conventional scissors undesirably permit a user to pass the fingers through the apertures such that the finger tips are not utilized to apply pressure to operate the scissors. This is avoided with the bowled apertures of the training scissors according to the disclosure. The bowled apertures 22a and 22b advantageously require the user to utilize the finger tips to operate the scissors.

The handled blade 14 has a cutting edge 30 opposite a handle 32. The handle 32 is configured as a large bowled aperture 32a similar in size and configuration to the large bowled aperture 22a. A pivot aperture 34 extends through the handled blade 14 to align with the pivot aperture 24.

In combination, the bowled apertures 22a, 22b, and 32a are configured to provide stability for the thumb, middle finger and index finger so that the fingers are secure and promote a desired scissors grasp pattern, with the finger tips bearing pressure to operate the scissors.

The shaft assembly 16 is configured to facilitate pivotal connection of the handled blades 12 and 14, and to also provide a mount for the illuminations source 18 as well as a location for a battery for the illumination source 18. The shaft assembly includes a shaft 40 having an aperture 40a, a cover 42, and a fastener 44. The shaft 40 also defines a mount 46 configured to fixedly receive and position the illumination source 18 and to place the illumination source in electrical communication with a battery located interior of the shaft 40 and accessible via the cover 42. The shaft 40 also includes a position sensor/switch and an associated timer circuit that is in electrical communication with the senses whether the scissors 10 are open or closed.

The illumination source 18 may be an illumination source such as an elongate light emitting diode or diodes configured to display two different light colors, such as red and green. The illumination source 18 is desirably configured to lie along the top of the handled blade 14 so that the illumination source 18 is aligned with the sight line of the user and is visible to the user during use of the scissors 10. The position sensor/switch and timer are configured so that the illumination source 18 illuminates in a first color, such as green, for a period of about 2 seconds when the user opens the scissors, and in a second and different color, such as red, for a period of about 2 seconds when the user closes the scissors.

Figure 2:
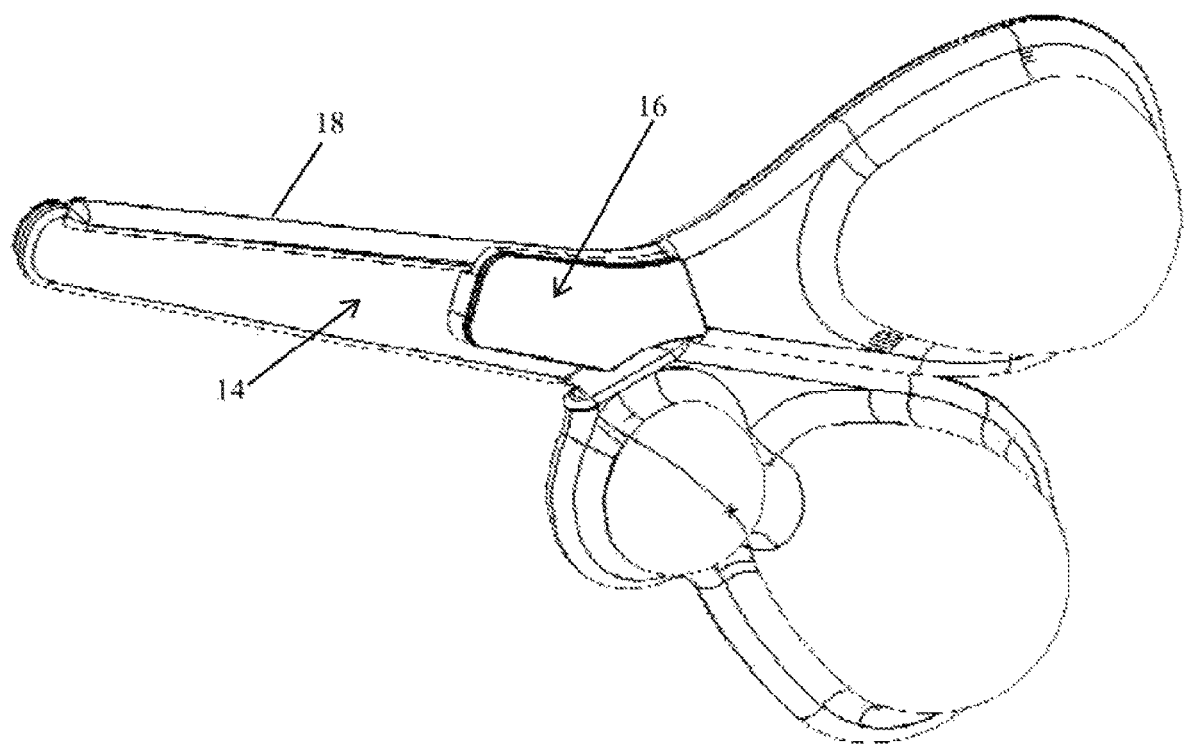
Figure 3:
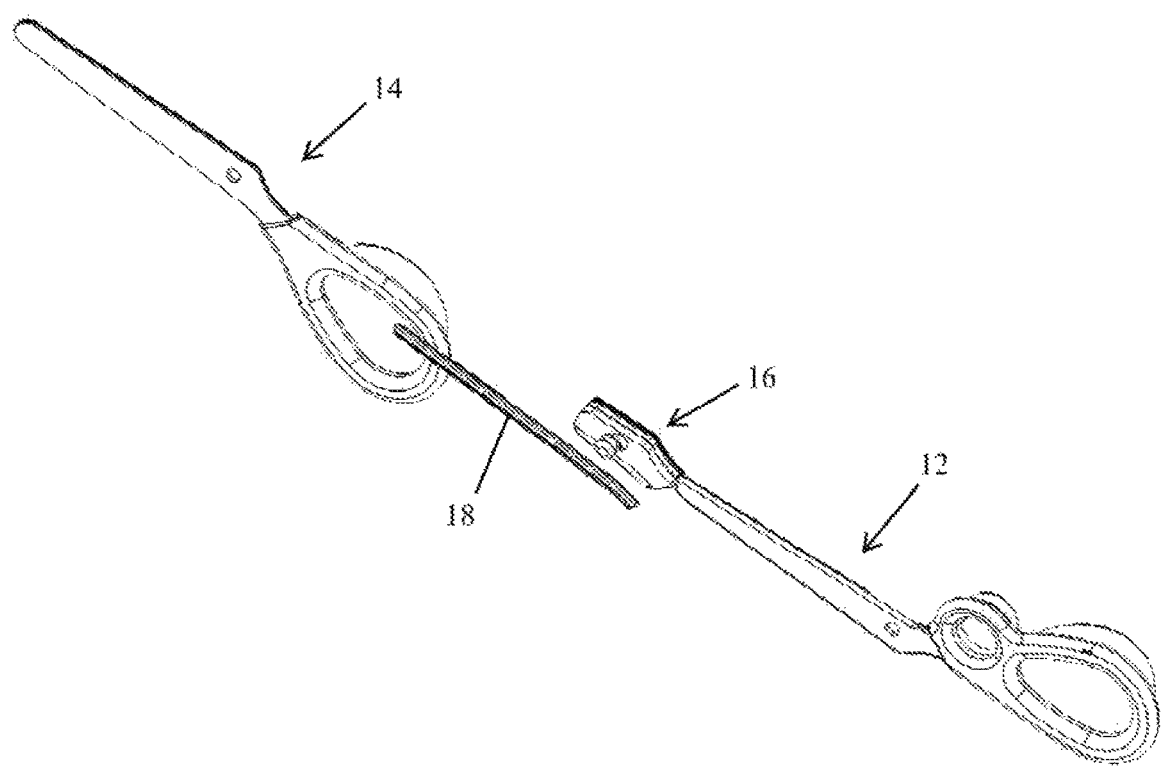
FIGS. 3 and 4 are exploded perspective views of the scissors of FIGS. 1 and 2.
Figure 4:
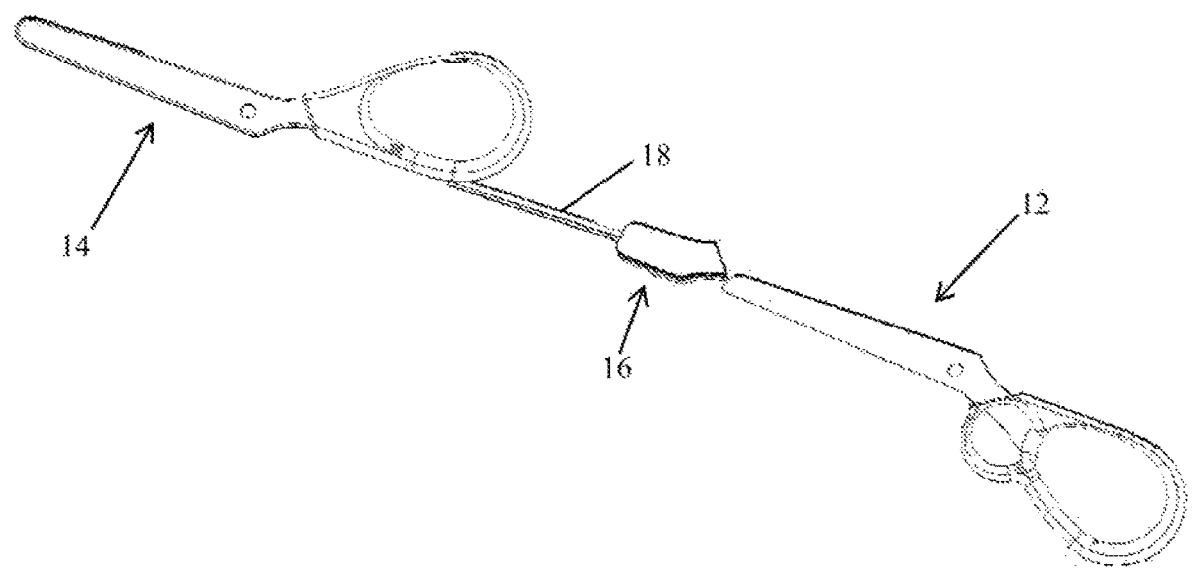
Figure 5A:
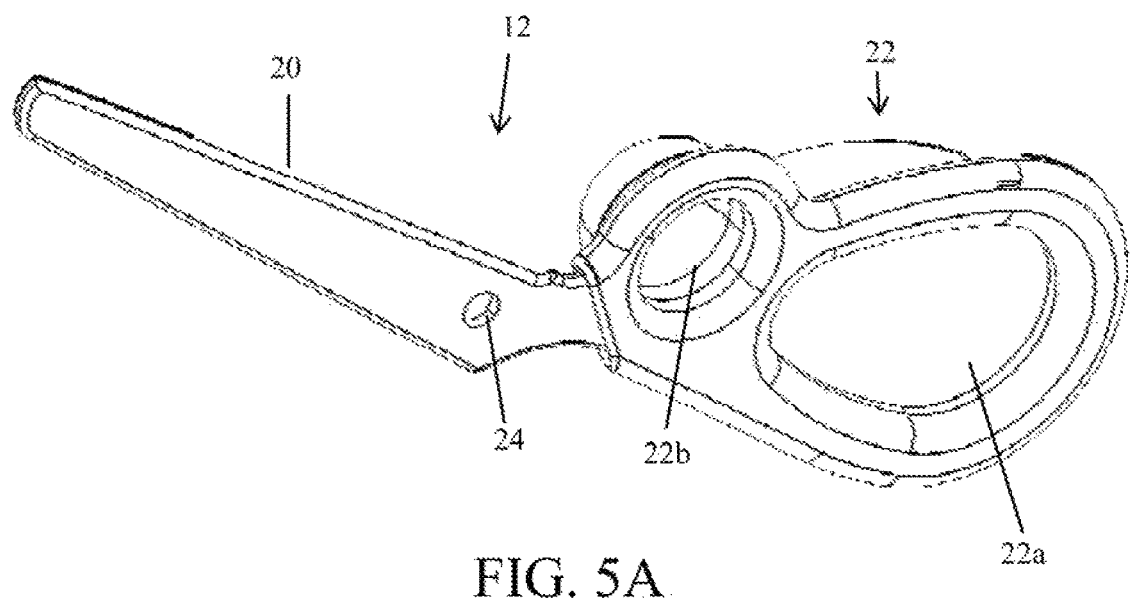
FIGS. 5A and 5B are perspective views of a first handled blade of the scissors of FIGS. 1 and 2.
Figure 5B:
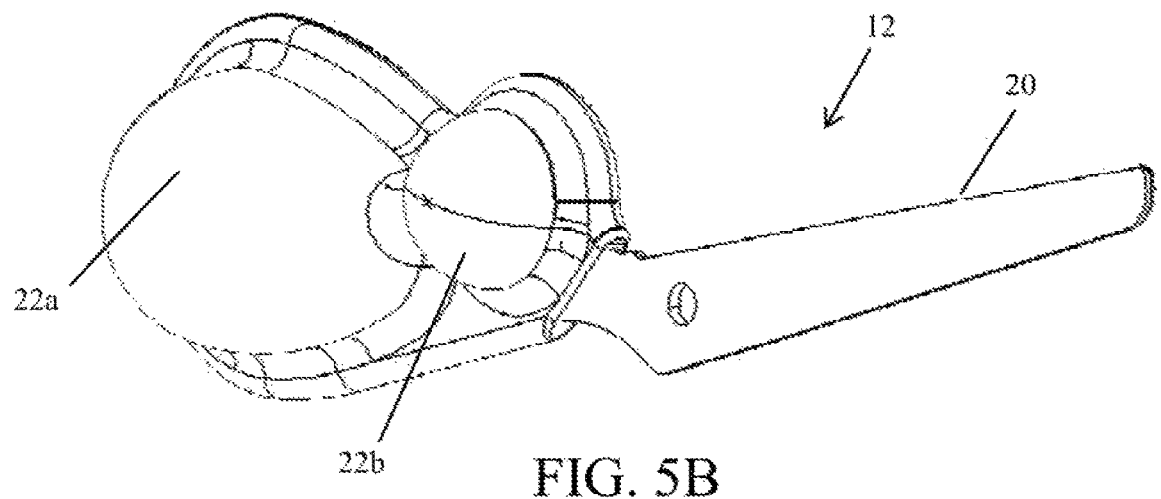
Figure 6A:
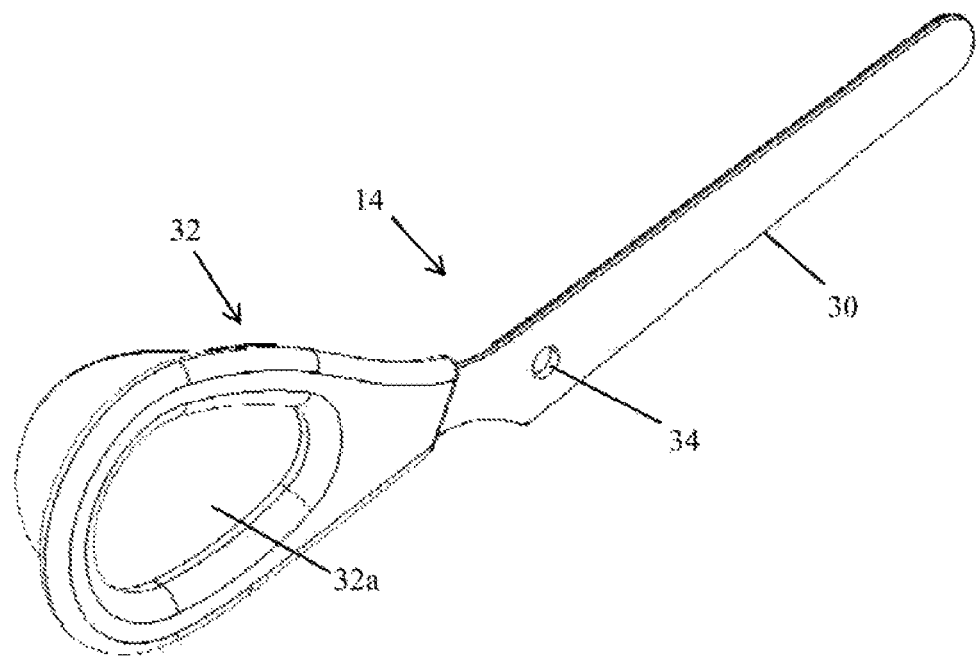
FIGS. 6A, 6B, 7A, and 7B are perspective views of a second handled blade of the scissors of FIGS. 1 and 2.
Figure 6B:
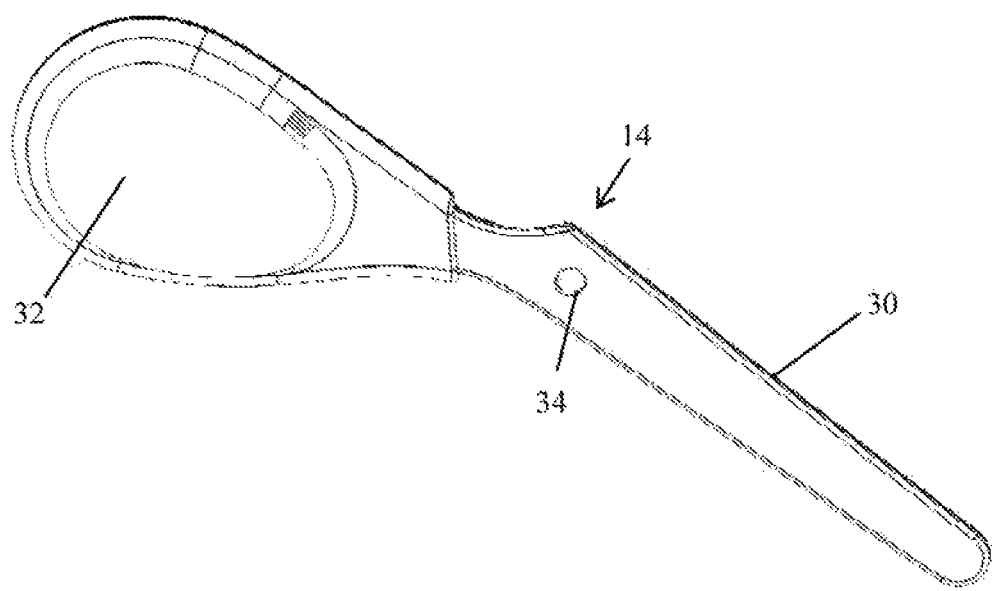
Figure 7A:
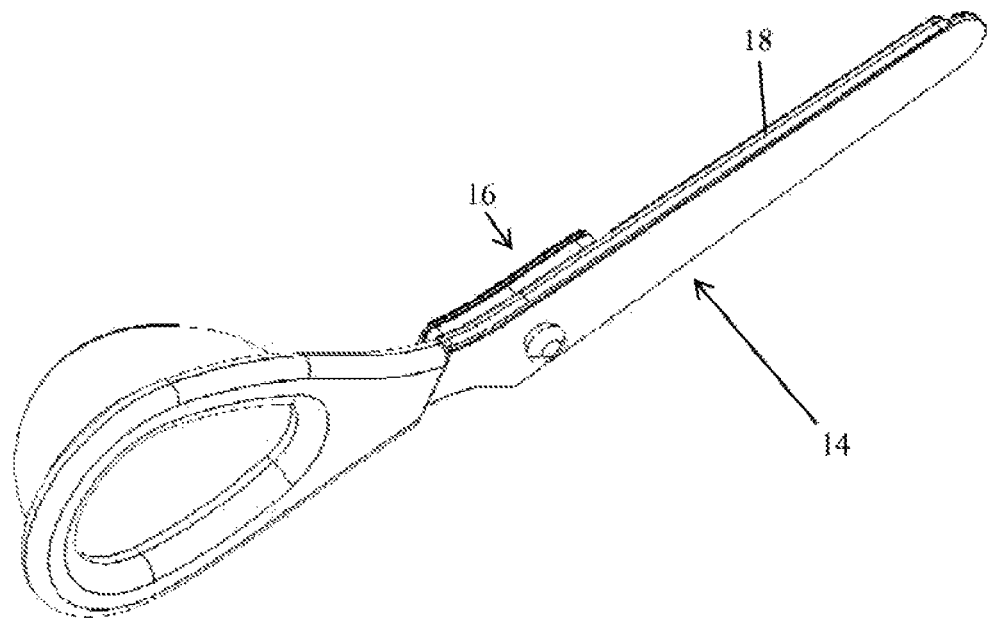
Figure 7B:
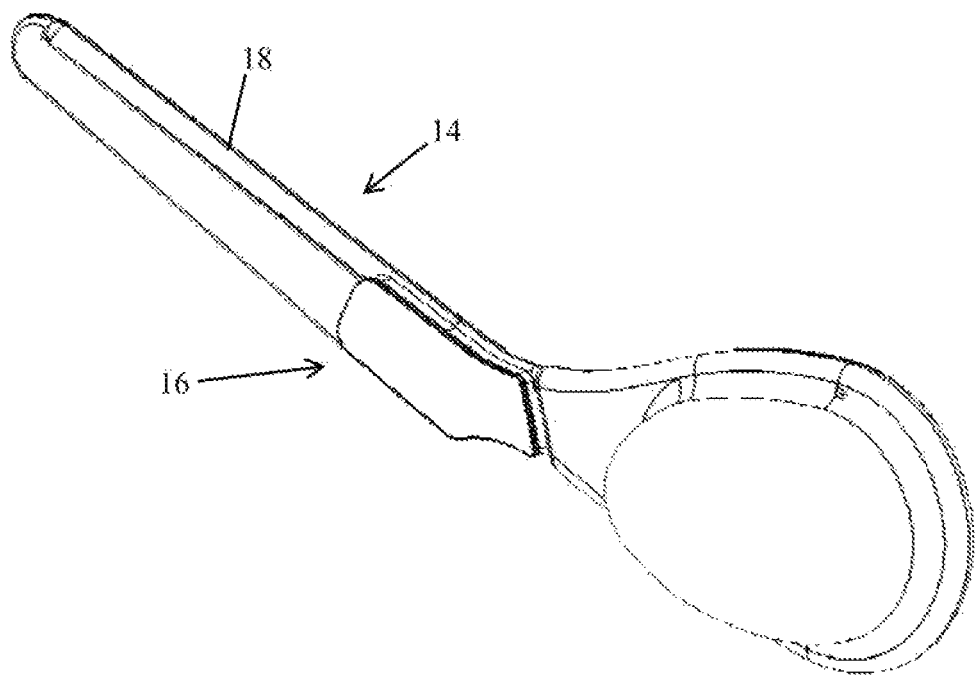
Figure 8:
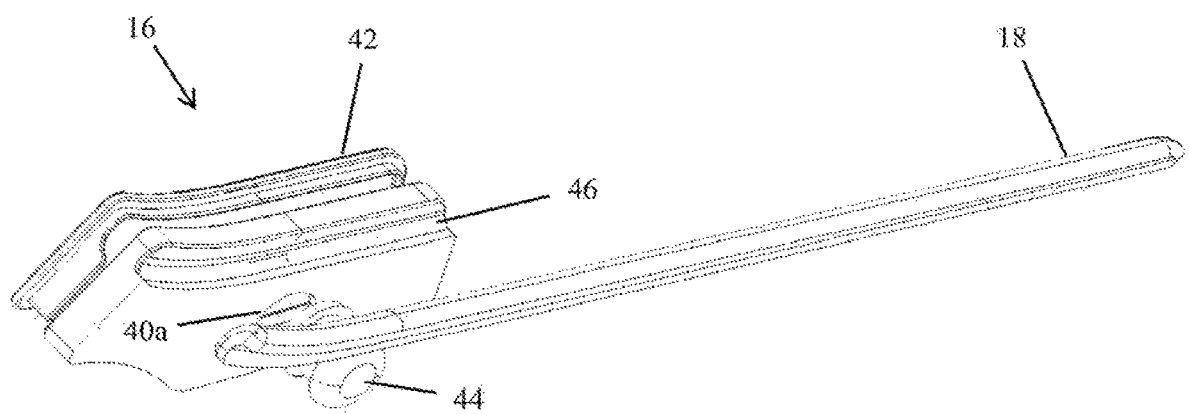
FIGS. 8 and 9 are perspective views of a shaft assembly and illumination source of the scissors of FIGS. 1 and 2.
Figure 9:
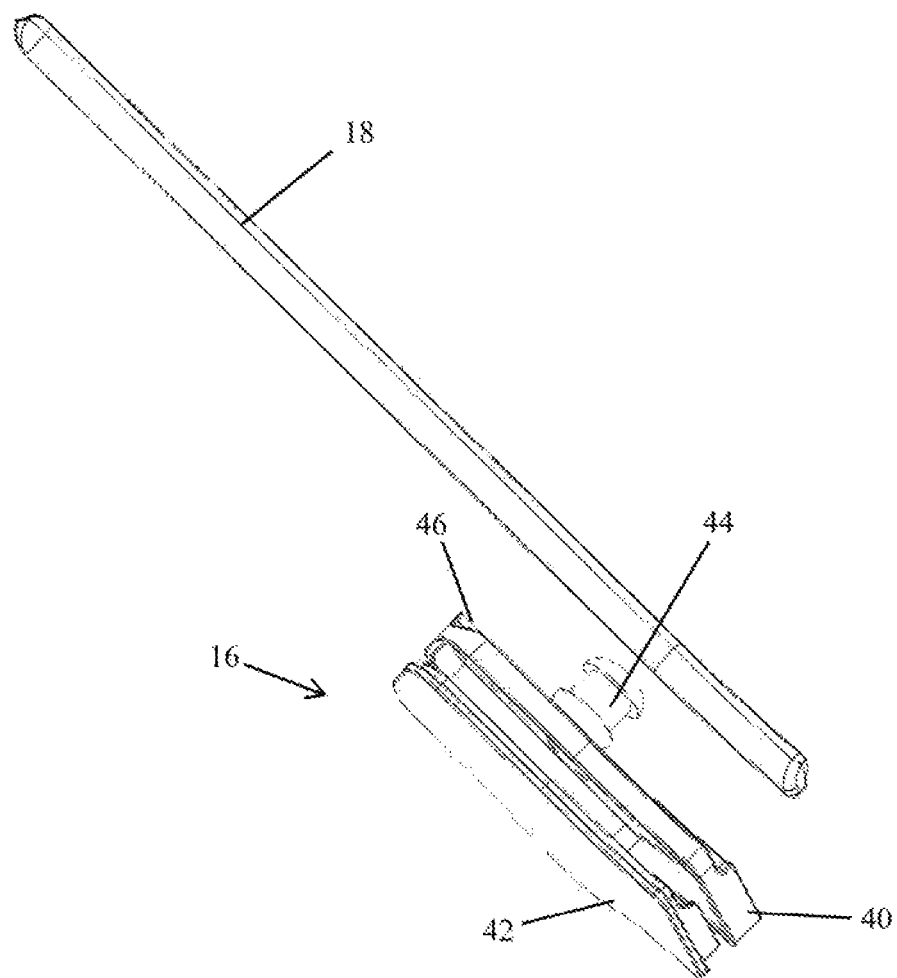

The scissors 10 are assembled by locating the handle blades 12 and 14 as seen in FIGS. 1 and 2, with the pivot apertures 24 and 34 aligned. The shaft 40 is located against the handle blade 14 with the aperture 40a aligned with the pivot aperture 34. The fastener 44 is then installed through the apertures 24, 34 and 40 and secured in place. The cover 42 is applied and the illuminations source 18 installed on the mount 46 to locate the illumination source 18 along the top of the handled blade 14. In this regard, it will be appreciated that the scissors 10 are intended to be used with the handled blade 14 located above the handled blade 12 so that the illumination source 18 lies in a direct sight plane to the eyes of the user during use of the scissors.

The scissors 10 are shown in a right-handed configuration. However, the scissors 10 may alternatively have a left-handed configuration which is substantially a mirror image to the right-handed configuration, where the bowled apertures extend from the opposite side of the scissors to that shown in the figures.

The scissors 10 are configured to motivate a child (generally ages 3 to 10) to want to engage in a cutting activity with the lighting feature. Most children don't have the intrinsic hand strength to open the blades of the scissors. Hand strength is developed by repetition of use of the scissors. Therefore, the lights are intended to encourage a child to practice opening and closing the blades as they are motivated by the light. Overtime, use of the scissors 10 will help a user to desirably operate the scissors using their fingertips, and help develop finger and hand strength.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed:

1. Training scissors, comprising:
a first handled blade pivotally connected to a second handled blade, the first handled blade having a first cutting edge opposite a first handle having a pair of bowled apertures shaped as solid bowls that block passage of fingers of a user and provide surfaces for contact with tips of the fingers of the user during operation of the scissors by the user;
a shaft assembly; and
an illumination source configured to display a first light color when the user opens the scissors and to display a second and different light color when the user closes the scissors.

2. The scissors of claim 1, wherein one of the pair of bowled apertures is larger than the other one of the pair of bowled apertures.

3. The scissors of claim 1, wherein a second handled blade has a second cutting edge opposite a second handle, and a bowled aperture shaped as a solid bowl that blocks additional fingers of the user.

4. The scissors of claim 3, wherein the shaft assembly is connected to the first and second handled blades and includes a mount configured to fixedly receive and position the illumination source.

5. The scissors of claim 4, wherein the shaft assembly also includes a position sensor/switch and associated timer circuit operatively associated with the first and second handled blades and configured to sense whether the scissors are in an open or a closed orientation.

6. The scissors of claim 5, wherein the position sensor/switch and associated timer circuit are configured to control operation of the illumination source so that the illumination source illuminates in a first color for a time period when the user opens the scissors, and in a second and different color for a time period when the user closes the scissors.

7. The scissors of claim 1, wherein the illumination source lies along a top of the first handled blade.

8. Training scissors, comprising: a first handled blade pivotally connected to a second handled blade, the first handled blade having a first cutting edge opposite a first handle having a pair of bowled apertures, with one of the bowled apertures being larger than the other one of the pair of bowled apertures, and each of the bowled apertures being shaped as a solid bowl to block passage of fingers of a user and provide surfaces for contact with tips of the fingers of the user during operation of the scissors by the user, and the second handled blade having a second cutting edge opposite a second handle comprising a solid bowl that blocks the fingers of the user,
and an illumination source configured to display a first light color when the user opens the scissors and to display a second and different light color when the user closes the scissors.

* * * * *